United States Patent
Lohberg (10) Patent No.: US 7,170,280 B2
(45) Date of Patent: Jan. 30, 2007

(54) METHOD AND DEVICE FOR THE DETECTION OF LOCAL DISPLACEMENTS AND ROTATIONS

(75) Inventor: Peter Lohberg, Friedrichsdorf (DE)

(73) Assignee: Continental Teves, AG and Company oHG, Frankfurt (DE)

(*) Notice: Subject to any disclaimer, the term of this patent is extended or adjusted under 35 U.S.C. 154(b) by 217 days.

(21) Appl. No.: 10/510,856

(22) PCT Filed: Apr. 16, 2003

(86) PCT No.: PCT/EP03/03947

§ 371 (c)(1),
(2), (4) Date: Oct. 12, 2004

(87) PCT Pub. No.: WO03/087845

PCT Pub. Date: Oct. 23, 2003

(65) Prior Publication Data

US 2005/0179429 A1  Aug. 18, 2005

(30) Foreign Application Priority Data

Apr. 18, 2002  (DE) ............................. 102 17 435

(51) Int. Cl.
*G01B 7/30* (2006.01)
(52) U.S. Cl. .................... 324/207.25; 324/207.24
(58) Field of Classification Search .......... 324/207.24, 324/207.25
See application file for complete search history.

(56) References Cited

U.S. PATENT DOCUMENTS

| | | | | |
|---|---|---|---|---|
| 3,586,965 A | * | 6/1971 | Whysong et al. | ............ 324/212 |
| 4,287,765 A | * | 9/1981 | Kreft | ........................ 73/514.31 |
| 5,424,638 A | * | 6/1995 | Huber | ......................... 324/212 |
| 6,340,908 B1 | | 1/2002 | Matuyama | |

FOREIGN PATENT DOCUMENTS

| | | |
|---|---|---|
| DE | 19501513 | 7/1996 |
| DE | 19620582 | 11/1997 |
| DE | 19906937 | 9/2000 |
| EP | 0504583 | 9/1992 |
| EP | 0922230 | 4/2002 |
| EP | 1243899 | 9/2002 |
| WO | 9949322 | 9/1999 |
| WO | 0054059 | 9/2000 |

* cited by examiner

Primary Examiner—Bot LeDynh (57) ABSTRACT

In a method for the detection of local displacements and rotations, a sum signal and additionally a difference signal are formed from two separately generated signals of two transducer elements (W1, W2), which are spaced from each other, and subsequently the formed sum signal and the formed difference signal are OR-operated. A device for doubling the local frequency of moving incremental scales comprises an encoder (1a, 1b, 1c), a magnetically sensitive transducer (9, 13), and a signal conditioning stage (6a, 6b) electrically connected thereto. The transducer comprises at least two sensorially active functional groups synchronously using sensorially active groups or sub-groups ($W_1$, $W_2$) which are locally offset in relation to each other by a local phase φ in order to scan the moving scale, and the functional groups comprise means enabling at least two independent partial signals $S_1 = V*\sin(\omega t)$ and $S_2 = -V*\sin(\omega t)+\phi)$ to be produced.

2 Claims, 10 Drawing Sheets

METHOD AND DEVICE FOR THE DETECTION OF LOCAL DISPLACEMENTS AND ROTATIONS

BACKGROUND OF THE INVENTION

The present invention relates to a method for the detection of local displacements and rotations and to a device for the local frequency doubling of moving incremental scales to detect local displacements and rotations.

Figure 1:
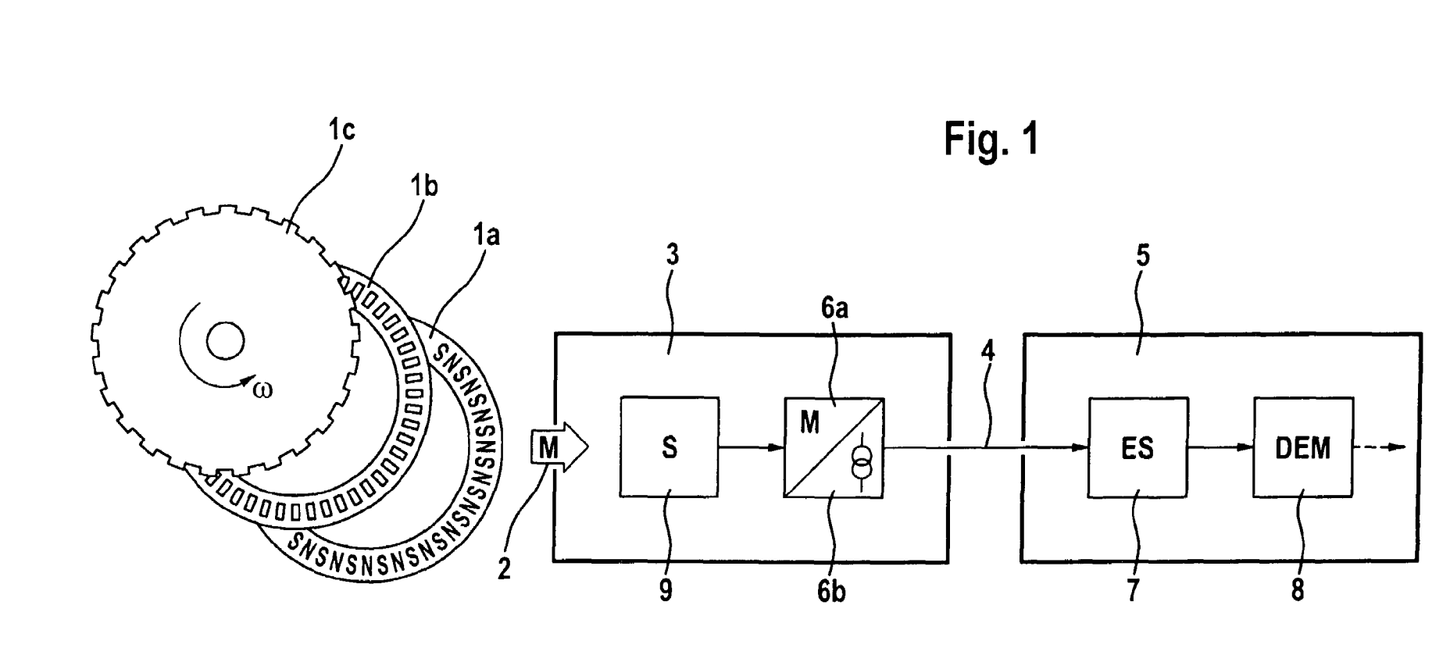
FIG. 1 shows the structure of the arrangement according to the invention.

Devices for the detection of rotational speeds in motor vehicles, as represented in FIG. 1, are principally known in the art. They comprise an encoder and a sensor magnetically scanning the encoder via an air slot. The encoder is a machine element, which is mechanically coupled to the rotating ring of a wheel bearing and carries an incremental angle scale. Said angle scale is designed as an integral sequence of magnetically alternating, differently effective areas forming a circular encoder track. It is conventional practice to use as encoders toothed wheels, ferromagnetic perforated discs or permanent-magnetized structures, e.g. magnetized wheel bearing seals. The sensor reacts to the periodic changes tooth/gap or hole/web or north/south pole with a periodic electric signal reproducing the incremental angular spacing as a temporal voltage or current variation. Induction coils, magnetoresistive bridges and Hall elements are used as sensorially active components, being partly operated in combination with additional electronic circuits. It is usual to designate sensors as 'active sensors' when they require a current supply for operation and as 'passive' sensors when they do not need an additional current supply for operation, exactly as induction coils.

EP-A-0 922 230 (P 8775) describes an arrangement for the detection of the rotational behavior of a rotating encoder, with a sensor module comprising the following functional groups: a sensor element on the basis of the magnetoresistive effect, a controllable current source supplying a load-independent current representative of the rotational behavior, and a modulator controlling the current source in response to signals of the sensor element. The sensor module is magnetically coupled to the encoder. The output signal is a signal representative of the rotational behavior with superposed status signals and/or additional signals. The status signals contain among others the information about the direction of rotation.

WO 99 49322 (P 9352) discloses an interface where the information about the direction of rotation and its validity is contained as two-bit information within an 8-bit word being sent after each rotational speed pulse. Further, active sensor elements on the basis of the Hall effect are known (TLE 4942, Infineon Technologies, Munich) wherein, apart from the number of rotations, also the information about the direction of rotation is transmitted in a coded form. As this occurs, the signal alternates between two current levels. The temporal distance of the leading edges signals the wheel speed, while the direction of rotation is coded based on different pulse durations.

Proposals have already been made to bisect the incremental bearing discrimination to reach higher air gaps and to compensate these thereafter by doubling mechanisms with the use of sensors locally shifted in relation to each other. Thus, DE 199 06 937 recommends using two Giant Magnetoresistive Effect sensors whose local positioning in relation to each other brings about a phase shift of roughly 90°. The signals of the two sensors are amplified, led through threshold value switches and exclusively OR-operated. Another objective is to determine the direction of rotation by means of flip-flop circuits. Further proposals are directed to arranging the sensors on one joint substrate in order to be able to maintain the distance between both sensors as precisely as possible.

The application of this prior art is obstructed in several ways in practical operations. Thus, it is necessary to combine identical sensors with encoders of different modules (module=reading diameter/encoder number of cycles) for the case of application of the detection of the rotational speed in an automobile. According to experience, the module range is between 1.2 mm and 2.5 mm, that means, a ratio of 2.5/1.2=roughly 2 must be covered. In order to always preserve a phase shift of roughly 90°, it would be necessary according to the state of the art to keep on stock a large number of different sensors adapted to different modules. This necessity counteracts the goal of an economical manufacture and quality of large piece numbers of an equal product. When module adaptation is omitted, another shortcoming occurs because, with increasing phase deviations from the nominal value of 90°, each of the exclusively OR-operated sensorial channels contributes an individually fluctuating pulse-duty factor to the total signal, with the result of inadmissibly increasing the jitter for the operation of modern brake controllers. To use a signal of this type, the effort required in the ECU is significantly higher compared to conventional sensors where the signal frequency follows the encoder frequency. Usually, the evaluation is made from leading to leading edge and from trailing to trailing edge in order to determine the wheel rotational speed. Jitter errors being caused by an unsymmetrical pulse-duty factor are hereby prevented. When two partial signals are mixed according to the proposal made in the above-mentioned DE 199 06 937, the error arising will be doubled because the ECU is now additionally required to make a distinction between two groups of edges, namely leading and trailing edges of the one partial channel and leading and trailing edges of the other partial channel. However, this also implies that a signal frequency, which undergoes evaluation in the described fashion, is not actually doubled. Instead, only the single encoder frequency is determined twice without additional efficiency. Thus, the prior art indicated (in DE 199 06 937) demands an exact phase shift of 90°, i.e. an absolute module adaptation, for its practical utilization, which is disadvantageous for the mentioned reasons.

Thus, an object of the present invention is to produce a signal with a double temporal number of cycles with one sensor per encoder angular period, e.g. north/south pole pair, tooth/gap. More specifically, the object of the invention is to reach a doubling of the local frequency of incremental scales being read by sensors by means of a field coupling effect. The invention is implemented in particular in the detection of linear travel shifts and/or angle shifts or the detection of associated motional speeds or rotational speeds in the automotive industry.

SUMMARY OF THE INVENTION

This object is achieved according to the invention by means of a method in which a sum signal and additionally a difference signal are formed from two separately generated signals of two magneto-electric transducer elements (W1, W2) which are spaced from each other, and subsequently the sum signal formed and the difference signal formed are OR-operated and by a device in which the transducer comprises at least two sensorially active functional groups synchronously using sensorially active groups or sub-groups ($W_1$, $W_2$) which are locally offset in relation to each other by a local phase φ in order to scan the moving scale, with said functional groups comprising means enabling at least two independent partial signals to be produced having mainly the variation according to the functions $S_1 = V^* \sin(\omega t)$ and $S_2 = -V^* \sin(\omega t) + \phi)$ According to the invention, two or more synchronously active, locally offset magneto-electric transducers are used, whose local offset (local phase) pictures itself as a signal phase angle when the encoder is moving. The generation of such a phase shift is required to realize the present invention.

The solution of the invention avoids the mentioned shortcomings of prior art devices, while the effort of realization is comparable.

According to a first preferred embodiment, the encoder exhibits a sequence of alternating permanent-magnetic north/south pole areas, which in particular have equal dimensions and form an encoder track that is closed to form a circle.

The encoder may also comprise a sequence of alternate ferromagnetic zones and magnetically non-conductive zones. Then, the teeth and gaps usually also have equal dimensions and form an encoder track closed to form a circle. In an alternative preferred embodiment of the device, the encoder therefore comprises a sequence of teeth and gaps made of a ferromagnetic material.

However, as an encoder, likewise a rule may be provided where the said areas are arranged in series. It is also possible that the teeth and gaps are serially arranged in such a fashion that they form a tooth rack.

In the case of an encoder with permanent-magnetic areas, it is especially preferred that the areas have equal dimensions and are fitted as an encoder track closed in a circle into the side wall of a pneumatic tire so that said encoder can be used for a per se known side wall torsion sensor ('Side-Wall-Torsion' sensor, hereinbelow referred to as SWT sensor). The number of the north/south pole pairs closed in a circle on the side wall of the tire amounts to exactly 24 in particular.

Preferred applications are realized in the field of known electronically controlled brake systems (ABS, TCS, ESP, etc.) or in control systems for suspension control (chassis systems), e.g. with angular position generators, motive adjustment devices, electrical coupling devices, etc. It is particularly preferred to use the invention in the detection of wheel speeds in motor vehicles, especially preferred for those integrated in wheel bearings. Another preferred use is in the field of SWT sensor systems.

The invention will be explained in detail hereinbelow by way of Figures. Further preferred embodiments can be taken from the following description of the Figures.

DETAILED DESCRIPTION OF THE DRAWINGS

As shown in FIG. 1, the arrangement of the invention optionally provides for an encoder 1a, 1b or 1c cooperating by way of a magnetic coupling 2 with an active sensor 3 that transmits, in turn, wheel speed signals to an electronic checking device 5 by way of an electric current interface 4. Herein, machine elements are generally referred to as encoders herein, which are designed as incremental scale embodiment. To explain the invention, angular scales are primarily used, however, all designs equally apply to linear travel scales or rules. The angular scale 1a is composed of an integral sequence of equal areas of alternating magnetic north and south poles forming an encoder track closed to form a circle. The encoder 1b is a ferromagnetic disc with a window, and encoder 1c is a gear wheel made of steel. The three encoders indicated are vicarious for the multitude of such encoder variants. For the rotational speed detection, the encoder is mechanically connected to the rotating ring of the wheel bearing, and the stationary active sensor scans the magnetic field strength variation of the encoder track in a magnetically non-contact manner (arrow M) across the air slot 2. A probe requiring an external electric energy supply for its operation is generally referred to as 'active' sensor. The encoder rotates at an angular velocity ω. The magnetically sensitive transducer 9 is designed technically in such a fashion that its transducer signals permit deriving either only the angular velocity (rotational wheel speed) or in addition the direction of rotation of the wheel (sign of the angular velocity). Both pieces of information are sent to a modulator 6a producing therefrom a coded signal, by means of which a current source 6b is actuated which sends a coded signal current through the electric connection 4 to the input stage 7 of the checking device 5. Connected downstream of the input stage is a demodulation stage 8 in which the angular velocity and the direction of rotation are recuperated as separate pieces of information. It is preferred in the invention to use as sensor elements those elements that comprise magneto-electrical transducers on the basis of XMR effects. It is especially preferred to use those sensors comprising transducers on the basis of the AMR effect (AMR=Anisotropic Magnetoresistive Effect) (see VDI-Technologie-zentrum, Duesseldorf, Technologieanalyse Magnetismus (Techno-logy Analysis Magnetism), volume 2). Of course, the invention also allows using other magneto-electric transducers such as transducers with Hall elements in particular.

Figure 2:
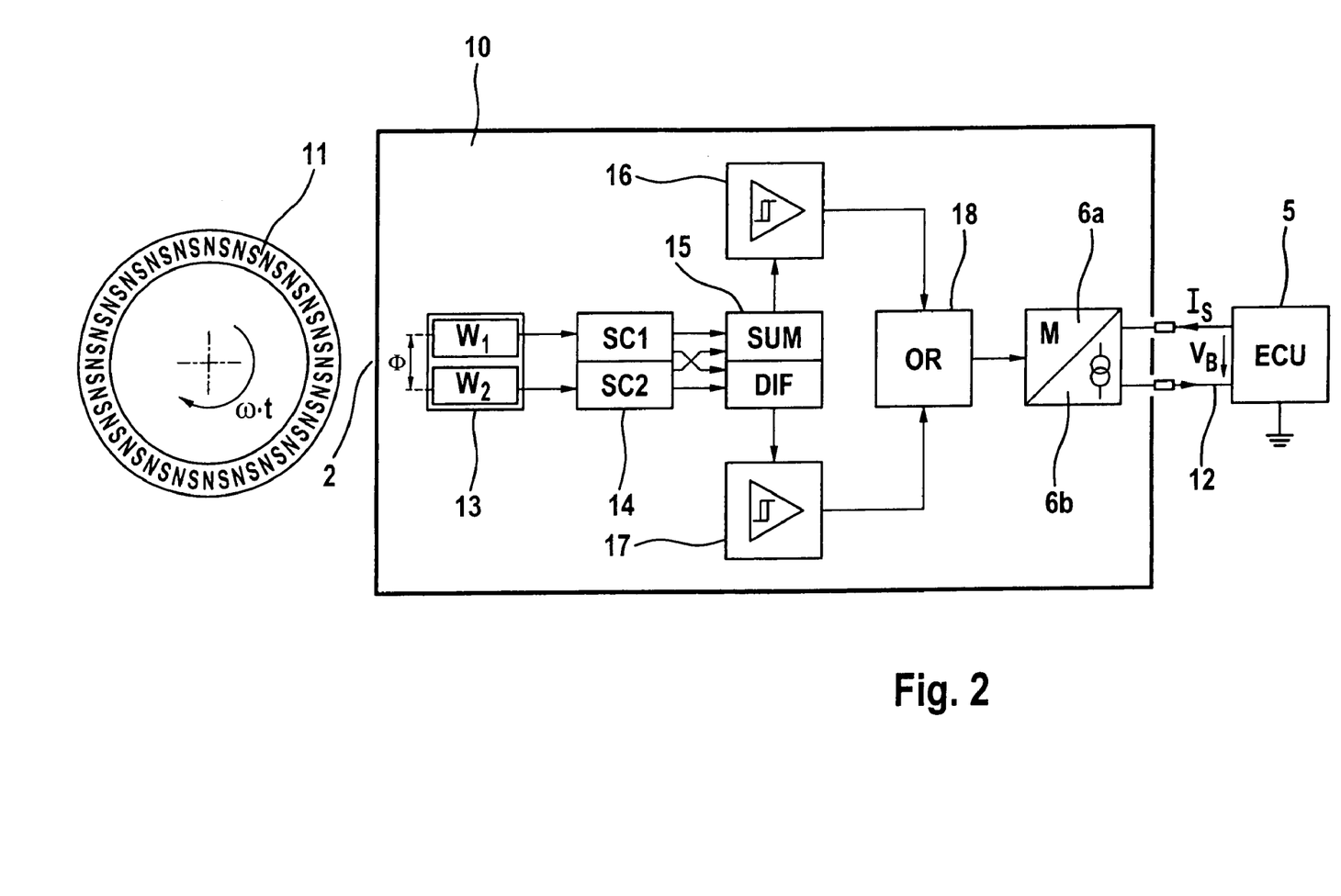
FIG. 2 is an illustration of the method and the device by way of the diagram of a sensor module.

The arrangement in FIG. 2 is composed of a sensor module 10 cooperating with a control unit 5 by way of a two-wire interface 12 and, simultaneously, with a magnetized encoder 11 by way of a magnetic interface 2. The control unit 5 feeds the sensor module with electrical energy by way of a voltage VB and receives the signal current $J_S$. Incorporated in the sensor module is a magneto-electric transducer 13 being composed of two components $W_1$ and $W_2$ which are offset by the distance Φ in relation to each other and act in such a manner that two signals $S_1 = A^* \sin(\omega t)$ and $S_2 = -A^* \sin(\omega t) + \phi)$ are produced in a rotating encoder, similar to the way described above. The signals $S_1$ and $S_2$ are amplified (SC1, SC2) separately in a signal-conditioning stage 14 and subsequently sent to a computing stage 15. Said computing stage contains two channels. The partial signal sum SUM=$S_1+S_2$ is produced in the first channel, and the partial signal difference DIF=$S_1-S_2$ is produced in the second channel. SUM and DIF are subsequently amplified separately in two equal amplifier stages with switching hysteresis 16, 17. The amplification factors are chosen to be just so high that a compromise between maximum steep zero passages and a minimum of disturbances is adjusted by a co-amplified offset. The partial signals are brought together by an OR-circuit 18 and sent to a modulator 6a with a signal current source 6b so that a defined signal current protocol can be produced. As will be shown later by way of FIG. 4, the signal composed of SUM and DIF has the favorable characteristic that always a total signal with a pulse-duty factor 1:1 is produced largely module-independently, which total signal can be evaluated by the ECU in a conventional manner from leading to leading edge and from trailing to trailing edge, with the result that the desired frequency doubling is achieved in addition.

Figure 3:
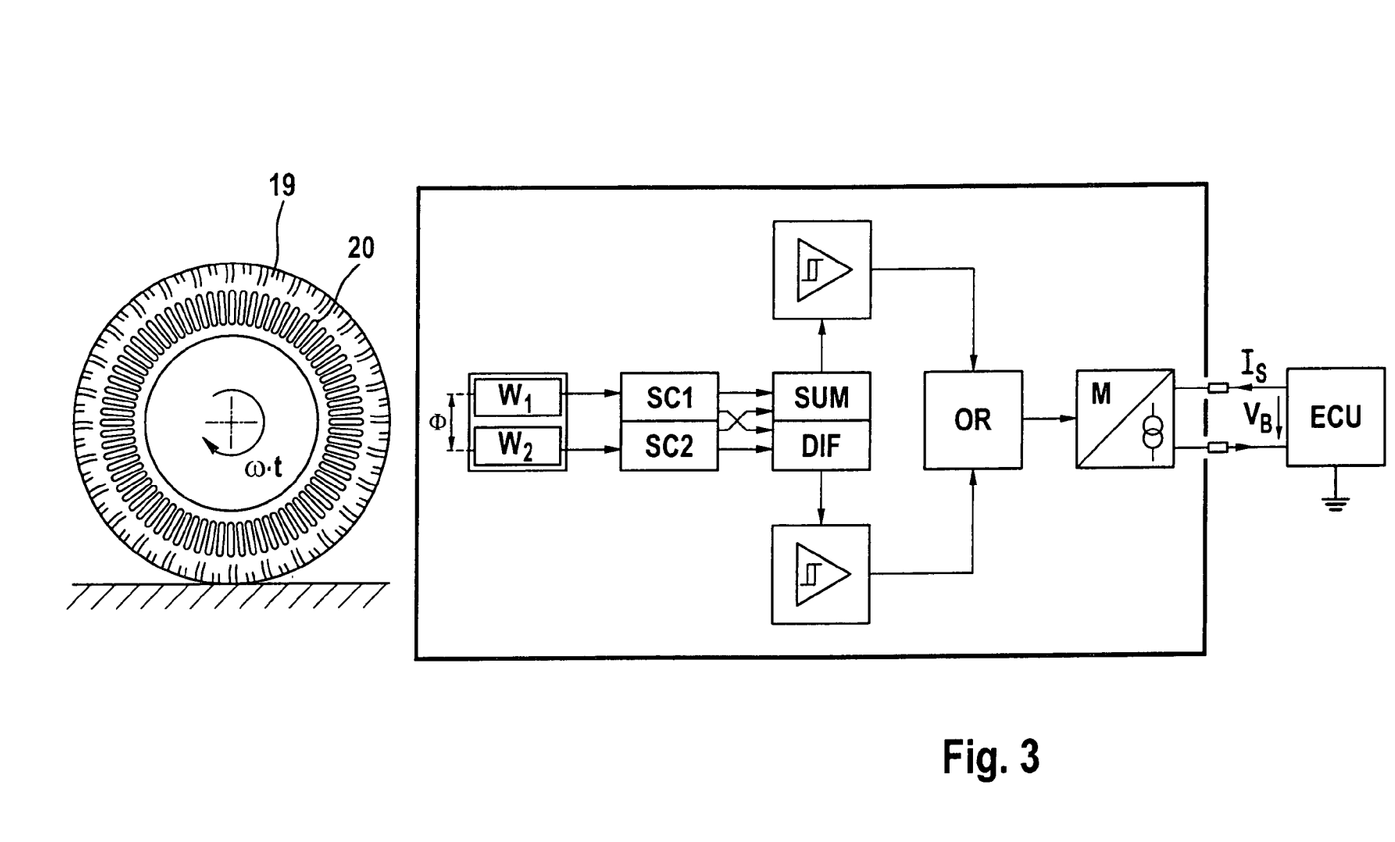
FIG. 3 is a possible combination with an SWT tire.

FIG. 3 shows an application variant of FIG. 2 for vehicle tires with an encoder-like magnetized side wall, as employed for so-called Side-Wall-Torsion Sensor equipment (SWT sensor equipment) e.g. according to DE 196 20 582 (P 8700). Strip-shaped north/south pole areas closing up to form an annular encoder track are alternately fitted to the side wall of tire 19. Two magnetically sensitive sensors arranged on top of each other scan the encoder track. An air gap of roughly 40 mm must be adjusted between side wall and sensor for the practical operation. This is currently achieved with a number of pole pairs of 24. However, there is the requirement of doubling the displacement. The implementation of the method of the invention in the illustrated sensor principle allows satisfying this requirement.

FIG. 4a explains the signal technology background of the invention by way of the example of a magnetoresistive bridge 21 below which a magnetized encoder track 22 is passed by. The four bridge resistances 23, 24, 25 and 26 are largely identical except for their direction of flow transferred with respect to the magnet vector of the encoder. The respectively prevailing direction of flow transferred is characterized by the symbols (+) and (−) implying increase or decrease of the bridge resistance based on the same field direction so that the development of the partial voltages $S_1$ and $S_2$ becomes apparent. There is a local distance $\phi$ between the bridge branches 23, 24 and 25, 26. FIG. 4b shows that an extreme value of the signal function SUM corresponds with the zero crossing of the signal function DIF in a positive local phase so that the signal variations remain orthogonal in relation to each other, meaning they always exhibit a phase shift of 90° relative one another. The same applies to the negative local phase according to FIG. 4c. The correlation is independent of the magnitude of the local phase in the desired module ratio 2:1 and thus reaches the goal of the invention. It is preferably suggested to realize a local phase of approximately 40° in the smallest desired module in the sensor.

Figure 5:
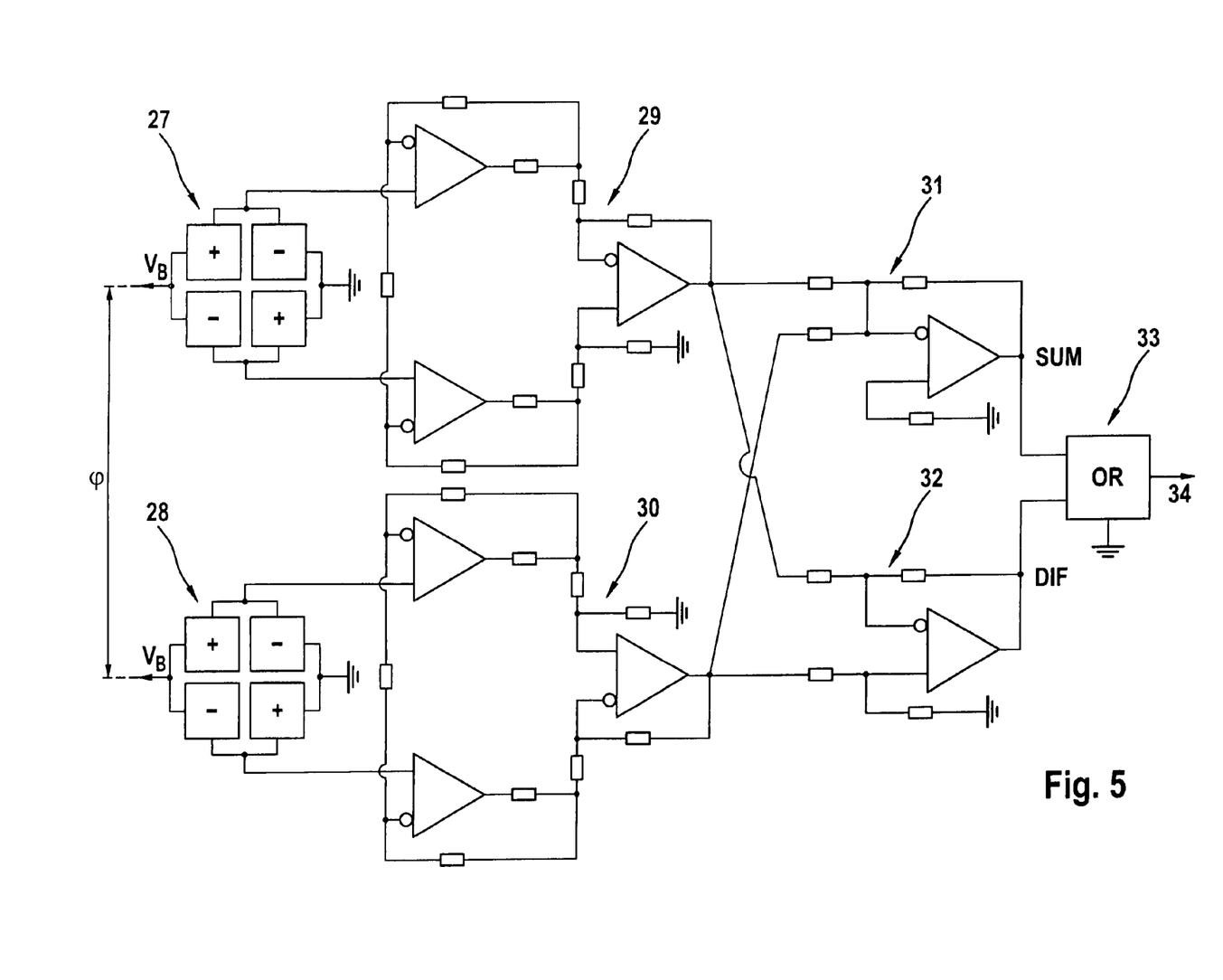
FIG. 5 shows an electronic circuit for implementing the method.

FIG. 5 shows a simple analog circuit for realizing the invention. Two magnetoresistive full bridges 27, 28 are used in this example, whose signals are conditioned alike by way of the instrumentation amplifiers 29, 30 and then sent simultaneously to a summing amplifier 31 and a difference amplifier 32. The output signals SUM and DIF are sent to an OR-member 33 so that the desired frequency-doubled signal can be tapped from output 34.

Figure 4:
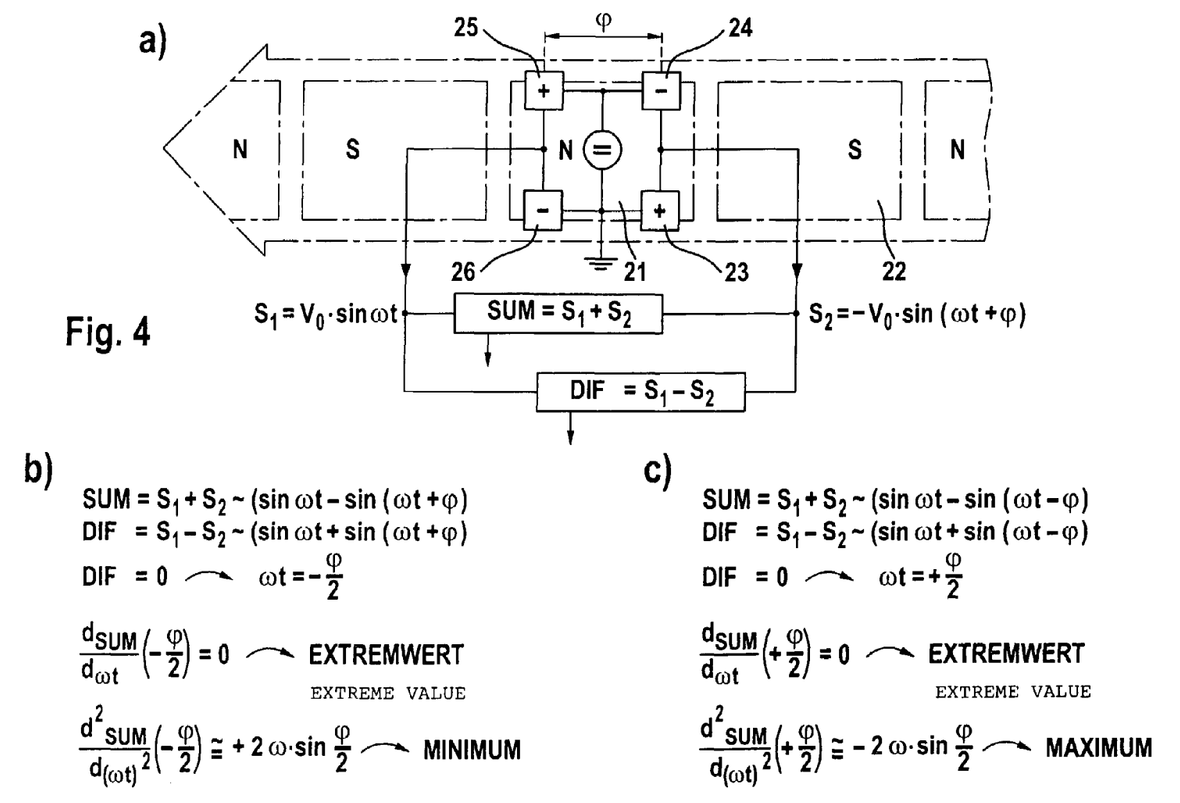
FIG. 4 shows the basis of the method in terms of signal technology.

According to another example (not shown), the signals of the electromagnetic partial transducers $W_1$, $W_2$ of FIG. 4 are also conditioned by means of corresponding instrumentation amplifiers 29, 30 and then sent to both a summing amplifier 31 and a difference amplifier 32. The output signals of these two amplifiers are then likewise sent to an OR-member 33, from the output 34 of which the desired frequency-doubled signal can be tapped.

Figure 6:
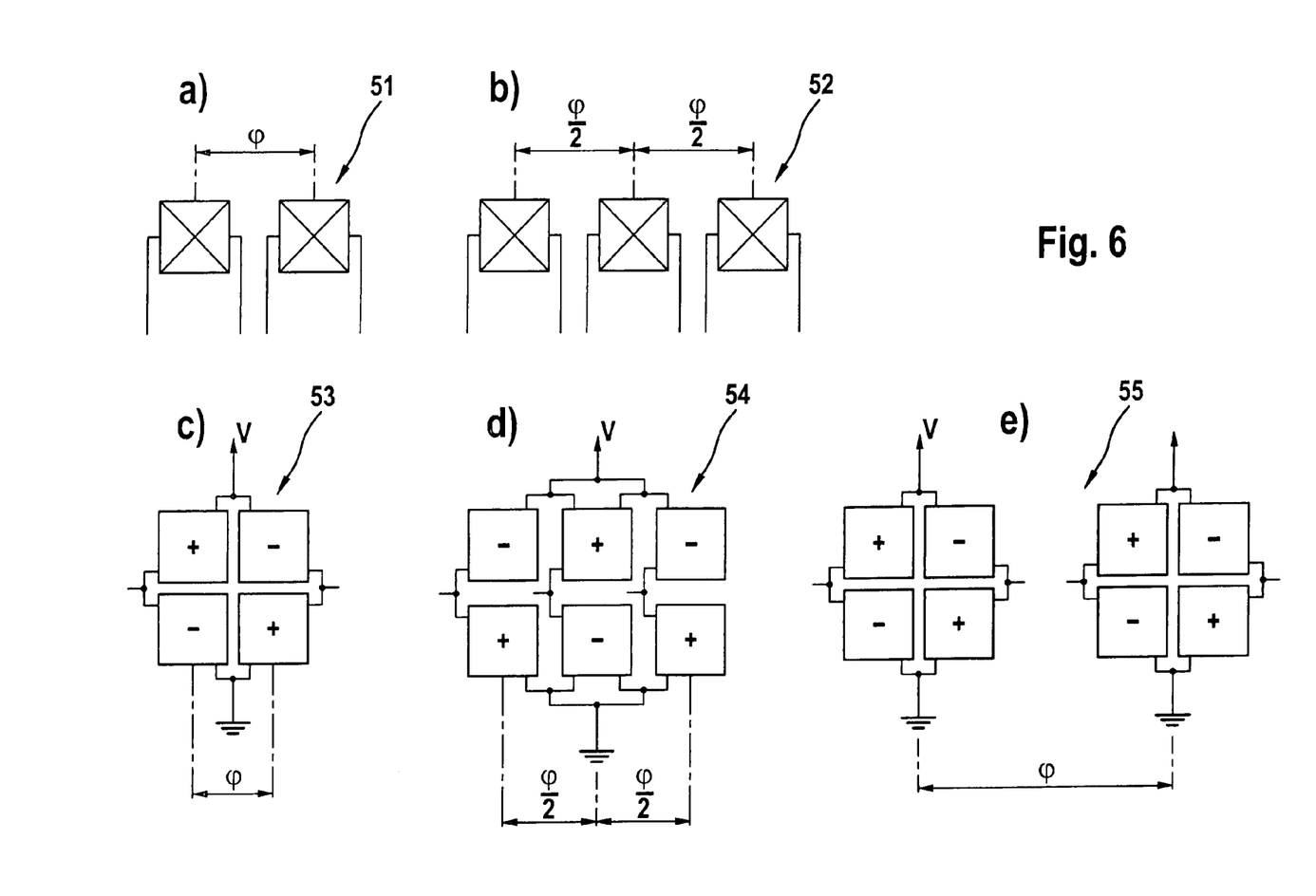
FIG. 6 shows examples of transducers with a local phase.

FIG. 6 shows examples of transducer arrangements and their effective mutual local displacement $\phi$ that can be used according to the invention. FIG. 6a shows two separate areas of a Hall assembly. FIG. 6b shows three separate areas of a Hall assembly, the middle area being associated jointly with the two outside areas. FIG. 6c symbolizes a magnetoresistive bridge having a local phase $\phi$ that is produced by the local distance of the two bridge branches. FIG. 6d shows a magnetoresistive bridge structure with three bridge branches, the middle bridge branch being associated with the two outside bridge branches. FIG. 6e shows two separate full bridges having a local phase $\phi$ that is produced by the local distance of the bridge centers.

The electromagnetic partial transducers $W_1$, $W_2$ and their local offset $\phi$ are preferably realized relative each other by two or three separate areas of a Hall assembly.

It is also suitable and therefore preferred that the electromagnetic partial transducers $W_1$, $W_2$ and their local offset $\phi$ are realized relative to each other by the distance of two or three bridge branches of a magnetoresistive bridge 53 or 54.

The sensorially active partial transducers favorably concern those types built up with magnetoresistive conductor structures to which a barber pole structure is fitted in addition.

It is also possible and therefore also preferred that the electromagnetic partial transducers ($W_1$, $W_2$) and their local offset $\phi$ relative to each other are realized by the distance from center to center of two magnetoresistive bridges 55.

Figure 7:
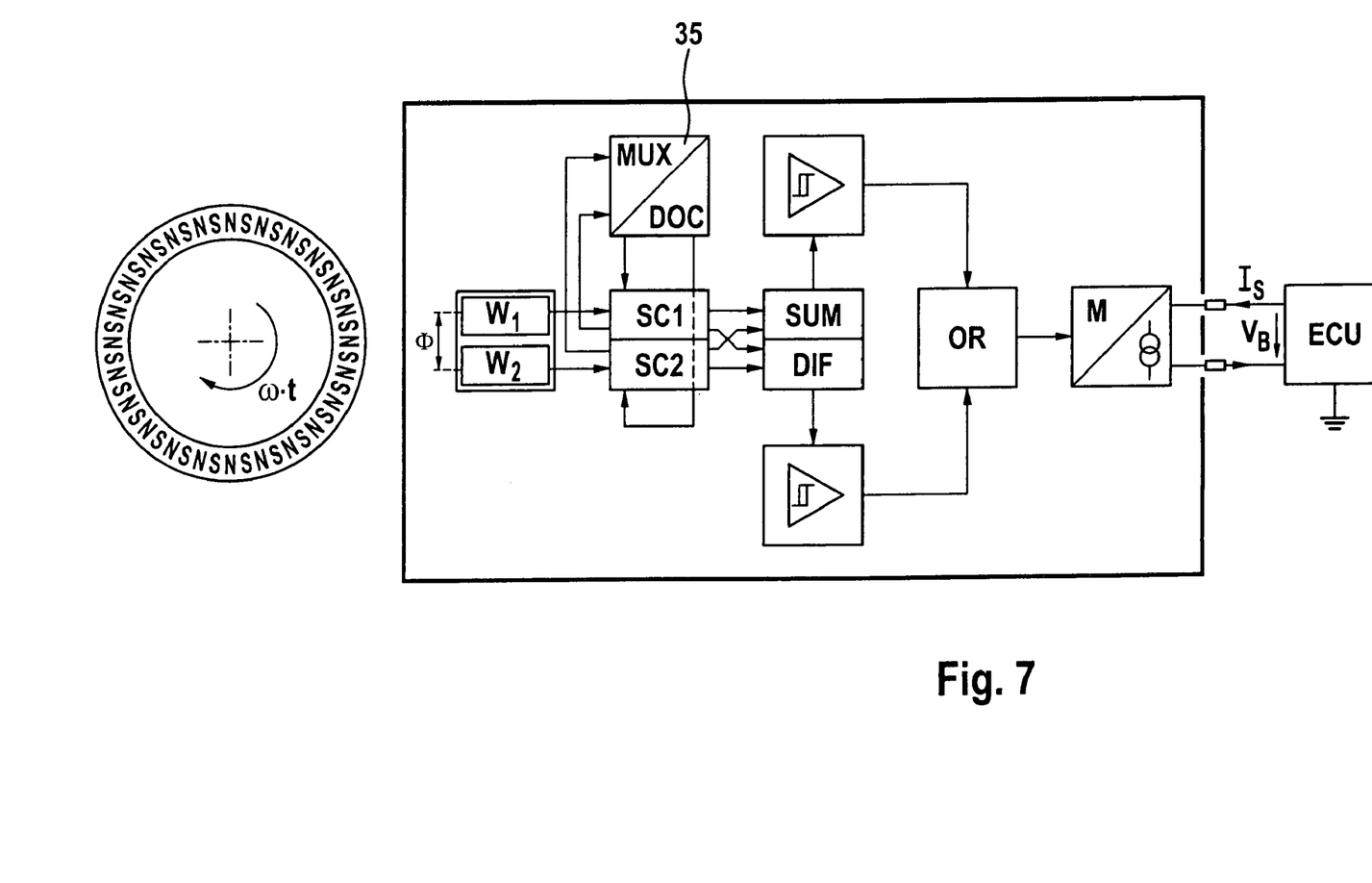
FIG. 7 is a variant of the method with digital offset compensation.

FIG. 7 shows an embodiment of the invention with a digital offset compensation 35 of the two partial signals from the transducers $W_1$ and $W_2$. The digital offset compensation allows a very high amplification of the signals SUM and DIF and, hence, a particularly high quality of the 90°-phase shift. In the example, the offset compensation is carried out by means of an electronic function unit 35 sending the signals from SC1 and SC2 alternately to the digital offset compensation stage (DOC) by way of a multiplex unit (MUX). Thereafter, the output signals SC1 and SC2 are mainly pure alternating current signals.

Figure 8:
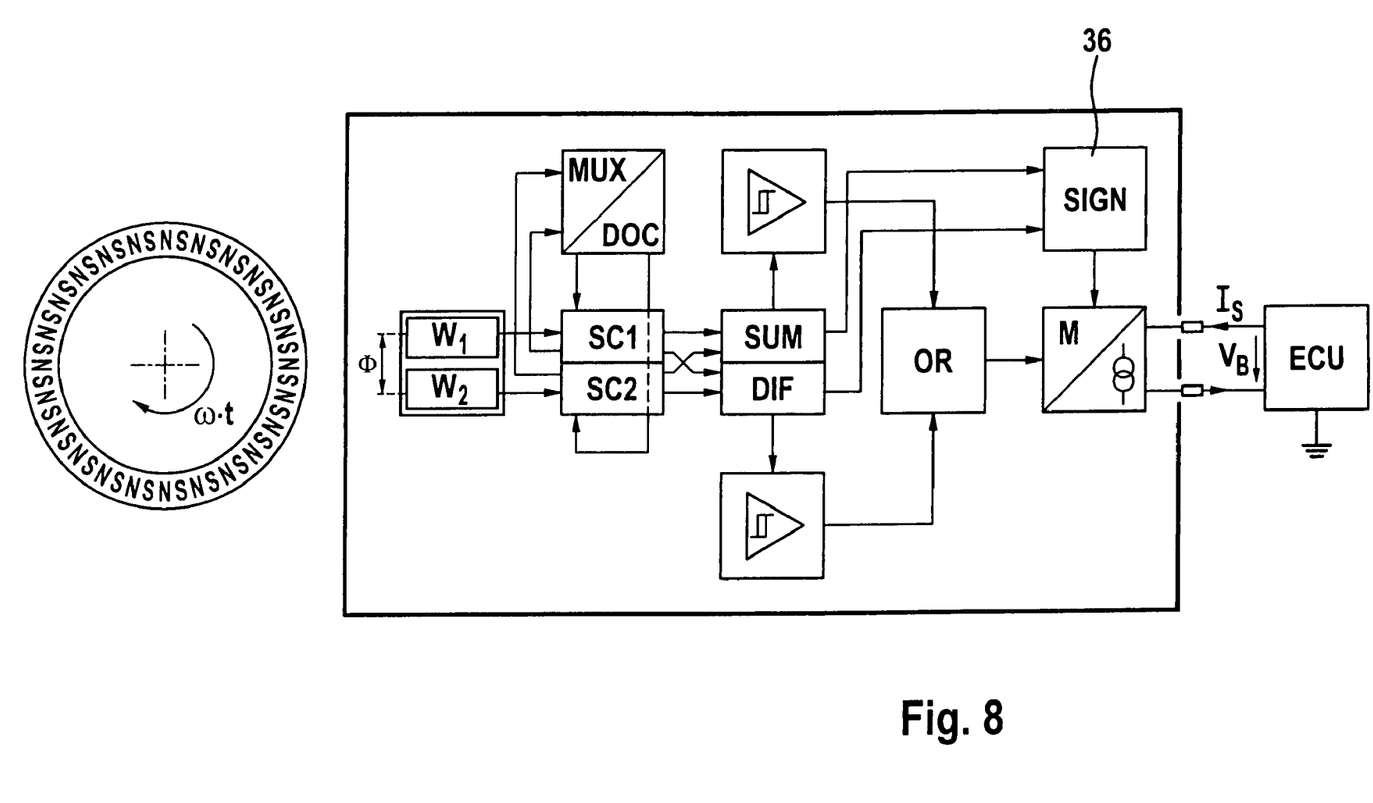
FIG. 8 is a variant of the method with a detection of the direction of rotation.

FIG. 8 shows an embodiment of FIG. 7 with an additional calculation of the direction of rotation in a step 36. It becomes apparent from FIGS. 4b and 4c that at the signal times DIF=0 the signal SUM adopts an extreme value, the sign of which is firmly related to the sign of $\phi$ (direction of rotation). This fact can be utilized for the detection of direction. Said method of the detection of direction is per se known from SAE Technical Paper #2000-01-0082, Stefan Pusch, however, not in relation to the applications according to the invention. It is also a preferred object of the invention to combine the per se known method of the detection of direction described in this paragraph with the method and the device of the present invention.

Figure 9:
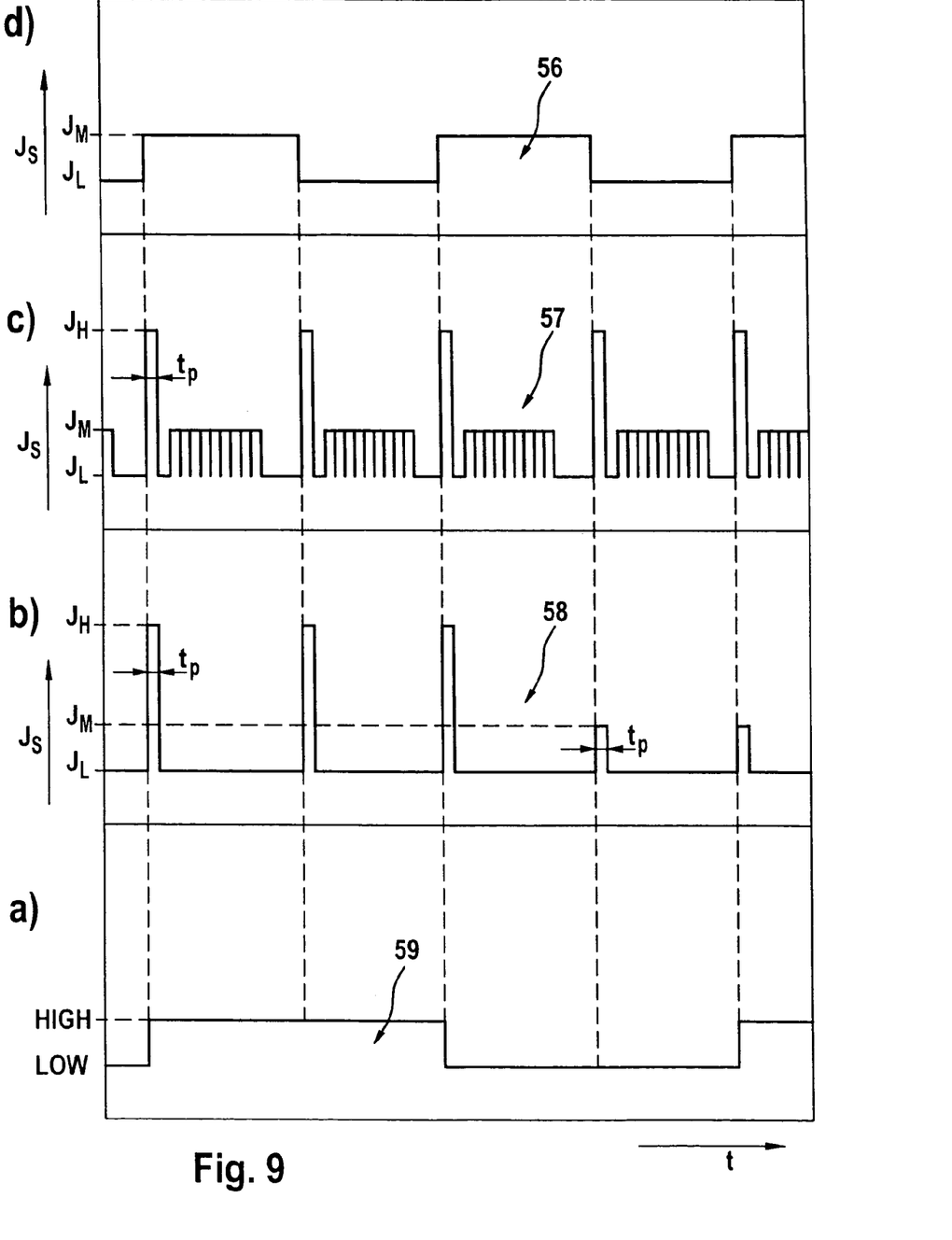
FIG. 9 shows different protocol variants of the signal current.

FIG. 9 shows proposals of the invention for realizing data protocols for the described sensor variants. Partial image 9a depicts the time variation of e.g. a toothed wheel of an encoder track. FIG. 9d shows an advantageous signal current protocol, the two amplitudes $J_L$ and $J_M$ of which follow with a double frequency the amplitude change of the encoder track. FIG. 9c shows a signal current protocol with the current levels $J_L$, $J_M$ and $J_H$. The pulse sequence $J_H$ characterizes the double encoder frequency. Thereafter follows a pause and then 9 bit additional information. The pulse length $t_p$ is additionally valid for the length of the pause and the length of the bits in the additional information. Especially favorably, the time period $t_p$ is in the range of about 50 μs. Among others, the information about the direction of rotation is coded in the additional information. FIG. 9b shows the proposal according to the invention of a simple protocol with the current levels $J_L$, $J_M$ and $J_H$ for the coding of rotational speed and direction of rotation. While the pulse distance reproduces the rotational speed, the direction of rotation is coded in the signal heights $J_M$ and $J_H$. The pulse length $t_p$ can range about 50 μs approximately also in this case. Especially appropriate values for the current intensities of the impulses are at $J_L$=7 ma, $J_M$=14 ma, and $J_H$=28 ma.

Modulator 6a illustrated in FIGS. 1 and 2 therefore produces, preferably in combination with the signal current source 6b likewise illustrated in these Figures, a signal current protocol 56 having two different amplitudes $J_L$ and $J_M$ that follow an encoder track change 59 (see partial image 9a) with a double frequency. Alternatively, it is preferred that the modulator 6a in combination with the signal current sources 6b produces a signal current protocol 57 having three different amplitudes $J_L$, $J_M$ and $J_H$ which follow an encoder track change 59 with a fourfold frequency, and further additional pieces of information, among others the direction of rotation, are coded into the signal pattern in addition to the wheel speed data.

In another preferred embodiment, modulator 6a produces in combination with the signal current source 6b a signal current protocol 58 having three different amplitudes $J_L$, $J_M$ and $J_H$ following an encoder track change 59 with a fourfold frequency, a distinction being made between two directions of rotation by way of the amplitudes $J_M$ and $J_H$.

The three signal current amplitudes $J_L$, $J_M$ and $J_H$ favorably lie at roughly 7 ma, 14 ma, and 28 ma. The pulse duration $t_p$ of the wheel speed information 57 and 58, respectively, suitably also amounts to 50 μs approximately.

Figure 10:
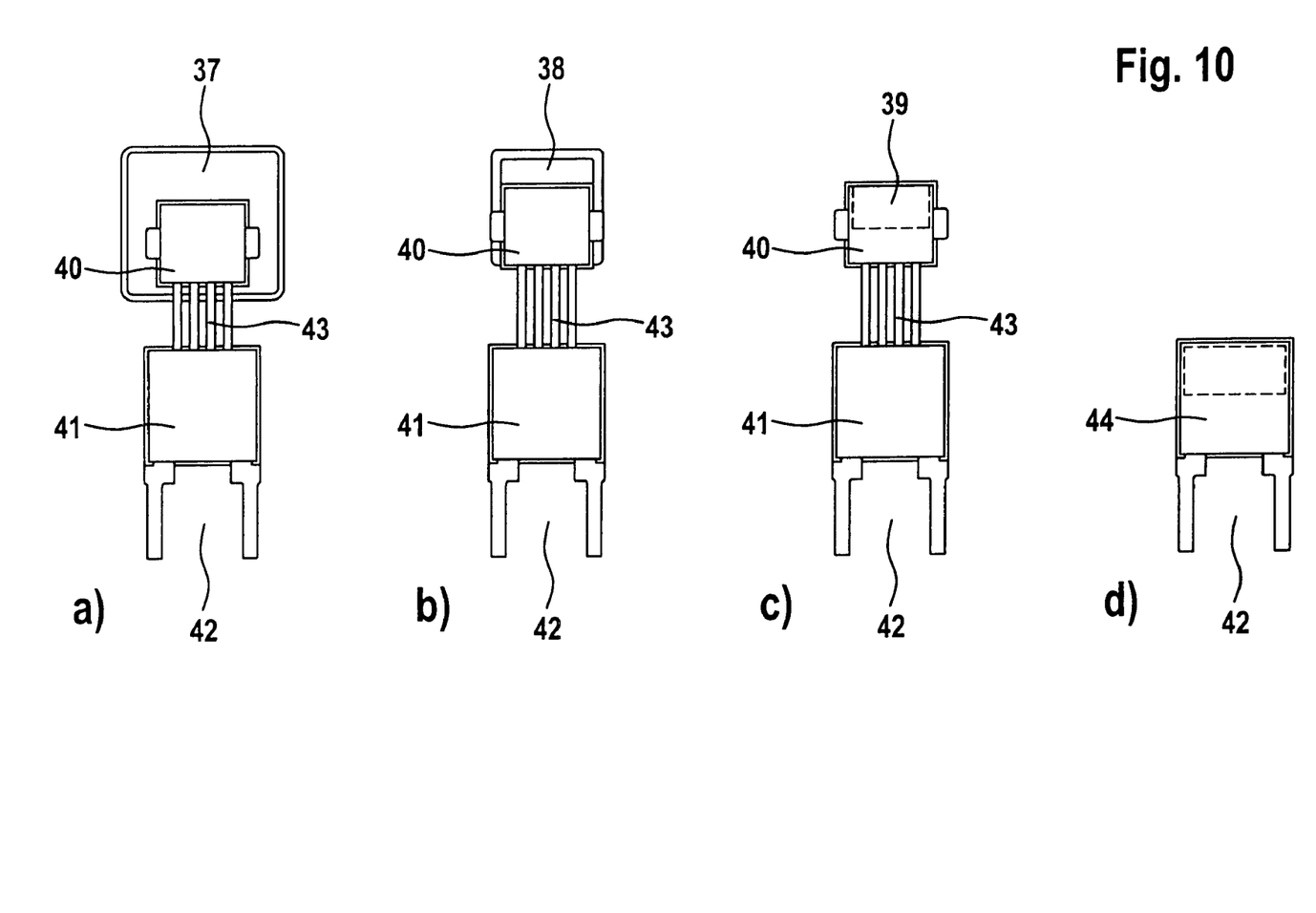
FIG. 10 shows different embodiments for housed sensor modules.

FIG. 10 shows embodiments of housings and biasing magnets as they can be favorably used in combination with the invention. Partial images 10a), b), and c) show embodiments with differently large magnets 37, 38, and 39. The magnets can further differ from each other in the direction of magnetization. The magneto-electric transducers $W_1$ and $W_2$ are accommodated in the housing member 40. The entire electronic circuitry for processing the transducer signals is accommodated in the housing member 41 with the two-wire outlet 42. There is a four-pole electric connection 43 between the function units in the housing elements 40 and 41. FIG. 10d shows an embodiment wherein the transducers and the electronic circuits are accommodated in one joint housing 44. SOI technology is used according to the invention.

According to another preferred embodiment, the device is integrated into a one-part housing 44, which accommodates the sensorially active partial transducers $W_1$ and $W_2$ as well as the necessary electronic circuits for the signal processing up to the two-wire outlet 42.

The shapes of the housings in the partial images a) to c) are usually employed in the field of the wheel speed sensor equipment. The same applies to the implementation of the current interfaces according to FIG. 9a and FIG. 9d. See in this regard PHILIPS DATA HANDBOOK SC17, pages 234 et seq. and page 170 et seq.

The invention claimed is:

1. A method for the detection of local displacements and rotations, wherein a sum signal and additionally a difference signal are formed from two separately generated signals of two magneto-electric transducer elements (W1, W2) which are spaced from each other, and subsequently the sum signal formed and the difference signal formed are OR-operated.

2. The method as claimed in claim 1, wherein the formed sum signal and the formed difference signal are respectively amplified at such a high rate that substantially square-wave signals are produced.

* * * * *